US007733525B2

(12) United States Patent
Cho et al.

(10) Patent No.: US 7,733,525 B2
(45) Date of Patent: Jun. 8, 2010

(54) GAMUT MAPPING METHOD AND APPARATUS

(75) Inventors: Min-ki Cho, Seoul (KR); Byoung-ho Kang, Yongin-si (KR); Se-eun Kim, Suwon-si (KR); Heui-keun Choh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 859 days.

(21) Appl. No.: 11/543,874

(22) Filed: Oct. 6, 2006

(65) Prior Publication Data
US 2007/0086028 A1 Apr. 19, 2007

(30) Foreign Application Priority Data
Oct. 14, 2005 (KR) .............. 10-2005-0097155

(51) Int. Cl.
*G06F 15/00* (2006.01)
(52) U.S. Cl. ...................... 358/1.9; 382/162
(58) Field of Classification Search ............. 358/1.9, 358/500–540; 382/162–167
See application file for complete search history.

(56) References Cited

U.S. PATENT DOCUMENTS 5,539,540 A * 7/1996 Spaulding et al. .......... 358/518
5,734,745 A * 3/1998 Ohneda ..................... 382/167
6,342,951 B1 * 1/2002 Eschbach et al. ........... 358/1.9
6,421,142 B1 * 7/2002 Lin et al. .................... 358/1.9
6,897,988 B1 * 5/2005 Saito et al. ................. 358/515
7,177,465 B1 * 2/2007 Takahira .................... 382/166
2003/0016862 A1 * 1/2003 Ohga ........................ 382/162
2003/0164968 A1 * 9/2003 Iida ........................... 358/1.9
2004/0109180 A1 * 6/2004 Braun et al. ................ 358/1.9

FOREIGN PATENT DOCUMENTS

JP       2004-178428 A      6/2004
KR  10-1999-0042024 A      6/1999
KR       10-0362379 A      11/2002

* cited by examiner

*Primary Examiner*—Twyler L Haskins
*Assistant Examiner*—Qian Yang
(74) *Attorney, Agent, or Firm*—Sughrue Mion, PLLC

(57) ABSTRACT

A gamut mapping method and apparatus are provided which allow a reproduction device to properly represent colors that are not within a gamut boundary of the reproduction device but within in a gamut boundary of a source device. The gamut mapping method includes (a) setting a cut-off rate for a predetermined color component and defining a cut-off region on a standard color circle; (b) determining a gamut of a reproduction device using color data which is part of basic color data and corresponds to colors that do not belong to the cut-off region; (c) modifying a gamut of a source device according to the determined gamut of the reproduction device; (d) determining a mapping relationship between the modified gamut of the source device and the determined gamut of the reproduction device; and (e) creating a mapping table based on the determined mapping relationship.

25 Claims, 8 Drawing Sheets

| INDEX | CMYK DATA (REFERENCE) | | | | CIELab DATA (MEASURED) | | |
|---|---|---|---|---|---|---|---|
| | C | M | Y | K | CIEL | CIEa | CIEb |
| 1 | % | % | % | % | 100.00 | 0.00 | 0.00 |
| 2 | % | % | % | 10% | 95.00 | 0.00 | 0.00 |
| ... | ... | ... | ... | ... | ... | ... | ... |
| N | 100% | 100% | 100% | 100% | 21.00 | 0.00 | 0.00 |

| INDEX | CIELab DATA [INPUT] | | | CMYK DATA [OUTPUT] | | | |
|---|---|---|---|---|---|---|---|
| | CIEL | CIEa | CIEb | C | M | Y | K |
| 1 | 0.00 | 0.00 | 0.00 | $C_1\%$ | $M_1\%$ | $Y_1\%$ | $K_1\%$ |
| 2 | 10.00 | 0.00 | 0.00 | $C_2\%$ | $M_2\%$ | $Y_2\%$ | $K_2\%$ |
| ... | ... | ... | ... | ... | ... | ... | ... |
| M | 100.00 | 100.00 | 100.00 | $C_M\%$ | $M_M\%$ | $Y_M\%$ | $K_M\%$ |

GAMUT MAPPING METHOD AND APPARATUS

CROSS-REFERENCE TO RELATED APPLICATION

This application claims priority from Korean Patent Application No. 10-2005-0097155 filed on Oct. 14, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to gamut mapping, and more particularly, to gamut mapping which can allow a reproduction device to properly represent colors that are not within a gamut boundary of the reproduction device but within a gamut boundary of a source device.

2. Description of the Related Art

In general, color input/output devices such as monitors, scanners, cameras, and printers which represent colors use different color spaces or different color models. For example, for reproducing color images, printers use a cyan-magenta-yellow (CMY) or cyan-magenta-yellow-black (CMYK) color space, color cathode ray tube (CRT) monitors or computer graphic devices use a red-green-blue (RGB) color space, and color input/output devices which are required to handle hue, saturation, and brightness all together use a hue-saturation-intensity (HSI) color space. A CIE color space is often used to define colors which can be accurately represented by any types of devices, i.e., device-independent colors. Examples of the CIE color space include a CIEXYZ color space, a CIELab color space, and a CIELuv color space.

A range of colors that can be represented, i.e., a gamut, may differ from one color input/output device to another. Accordingly, color input/output devices having different gamuts may represent the same image differently. Therefore, in a case when a gamut of a source color input/output device which provides an input color signal is different from a gamut of a target color input/output device which represents a color corresponding to the input color signal, gamut mapping is needed to appropriately convert the input color signal such that the gamut of the source color input/output device can match the gamut of the target color input/output device and that the color reproducibility of the input color signal can be enhanced.

FIG. 1 is a diagram for explaining related art gamut mapping. Referring to FIG. 1, reference character S1 represents a gamut of a source device, reference character S2 represents a gamut of a target device, X1 represents an original color provided by the source device, and X2 represents a color obtained by performing gamut mapping on the original color X1.

Since the gamut S1 of the source device is wider than the gamut S2 of the target device, as illustrated in FIG. 1, gamut mapping must be performed on the original color X1 using the Gamut boundary descriptors (GBDs) of the source device and the target device such that the original color X1 can be mapped to the inside of the gamut S2 of the target device. In other words, gamut mapping is a process of enabling the target device to properly represent the color X1, which is provided by the source device and is outside the gamut S1 of the target device, by mapping the color X1 to the color X2 which is located on the boundary of the gamut S2 of the target device.

In general, a related art gamut mapping operation for different color input/output devices may be performed by converting a color space of an input color signal and converting the lightness and chroma of the resulting input color signal while keeping the hue of the resulting input color signal. In detail, a color space of an input color signal may be converted from a device-dependent color space (DDCS) such as an RGB color space or a CMYK color space to a device-independent color space (DICS) such as a CIEXYZ color space or a CIELab color space, and the DICS is converted to an LCH coordinate system representing lightness, hue, and chroma. Thereafter, gamut mapping is performed on the input color signal on a plane where hue is uniform, i.e., a lightness-chroma (LC) plane, such that the lightness and chroma of the input color signal can be appropriately changed.

Related art gamut mapping methods are broadly classified into a gamut mapping method in which gamut mapping is performed such that accuracy, and brightness/contrast can be enhanced and a gamut mapping method in which different gamut mapping techniques are applied to different gamuts. These related art gamut mapping methods, however, simply use an original gamut of a source device (such as a monitor) as it is. No specific methods capable of properly realizing an original gamut of a source device by appropriately adjusting a gamut of a reproduction device such as a printer have been suggested.

A gamut of a monitor includes a gamut of a printer for most hues. However, referring to FIG. 2, there are colors, such as cyan (C), which cannot be properly represented by a source device such as a monitor, but can be represented by a reproduction device such as a printer. Obviously, there is no need for a printer to represent colors which cannot be represented by a monitor. However, a printer may make C, which is generally displayed by a monitor, appear darker than it actually is.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a gamut mapping method and apparatus in which can obtain a proper representation of an original color by removing part of a gamut of a printer which cannot be represented by a monitor and performing color mapping on the remaining gamut of the printer.

However, the aspects of the present invention are not restricted to the one set forth herein. The above and other aspects of the present invention will become more apparent to one of ordinary skill in the art to which the present invention pertains by referencing a detailed description of the present invention given below.

According to an aspect of the present invention, there is provided a gamut mapping method. The gamut mapping method includes (a) setting a cut-off rate for a predetermined color component and defining a cut-off region on a standard color circle; (b) determining a gamut of a reproduction device using color data which is part of basic color data and corresponds to colors that do not belong to the cut-off region; (c) modifying a gamut of a source device according to the determined gamut of the reproduction device; (d) determining a mapping relationship between the modified gamut of the source device and the determined gamut of the reproduction device; and (e) creating a mapping table based on the determined mapping relationship, the mapping table presenting a relationship between color data represented in a color space of the source device and color data represented in a color space of the reproduction device.

According to another aspect of the present invention, there is provided a gamut mapping apparatus. The gamut mapping apparatus includes: a cut-off region setting unit which sets a cut-off rate for a predetermined color component and defines a cut-off region on a standard color circle; a gamut setting unit which determines a gamut of a reproduction device using color data which is part of basic color data and corresponds to colors that do not belong to the cut-off region; and a gamut mapping unit which modifies a gamut of a source device according to the determined gamut of the reproduction device, determines mapping relationship between the modified gamut of the source device and the determined gamut of the reproduction device, and creates a mapping table based on the determined mapping relationship, the mapping table presenting relationship between color data represented in a color space of the source device and color data represented in a color space of the reproduction device.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
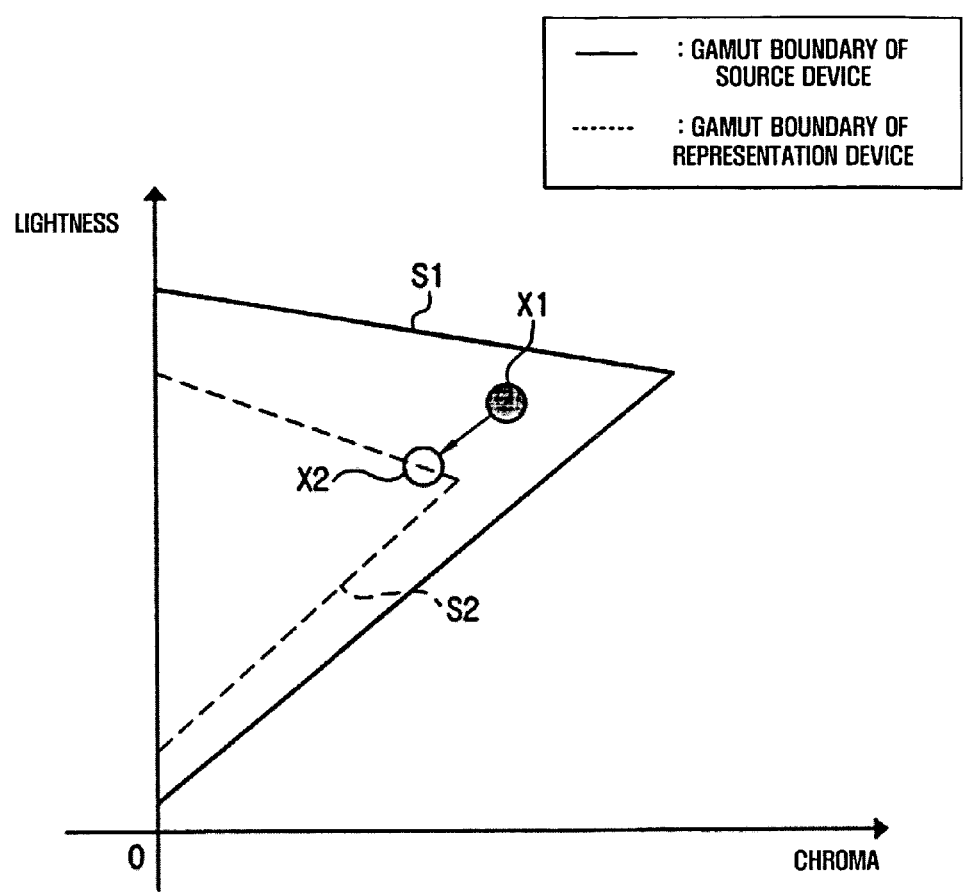
FIG. 1 is a diagram for explaining related art gamut mapping.
Figure 2:
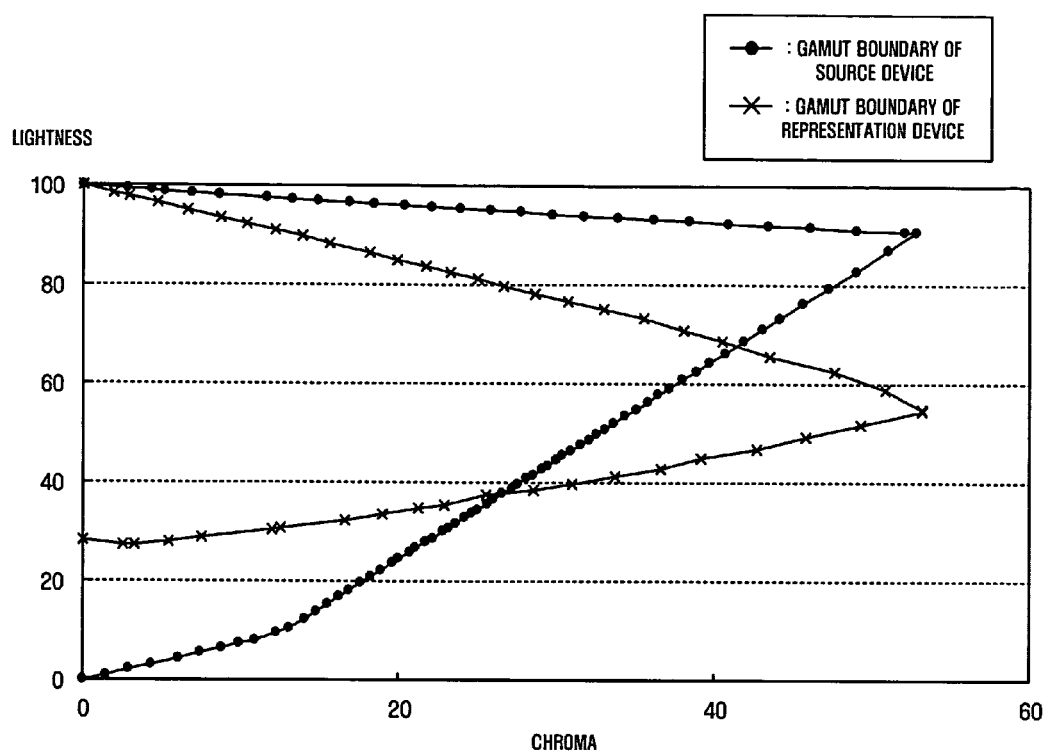
FIG. 2 is a diagram for comparing a cyan (C) gamut of a source device with a cyan a gamut of a reproduction device.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Figure 3:
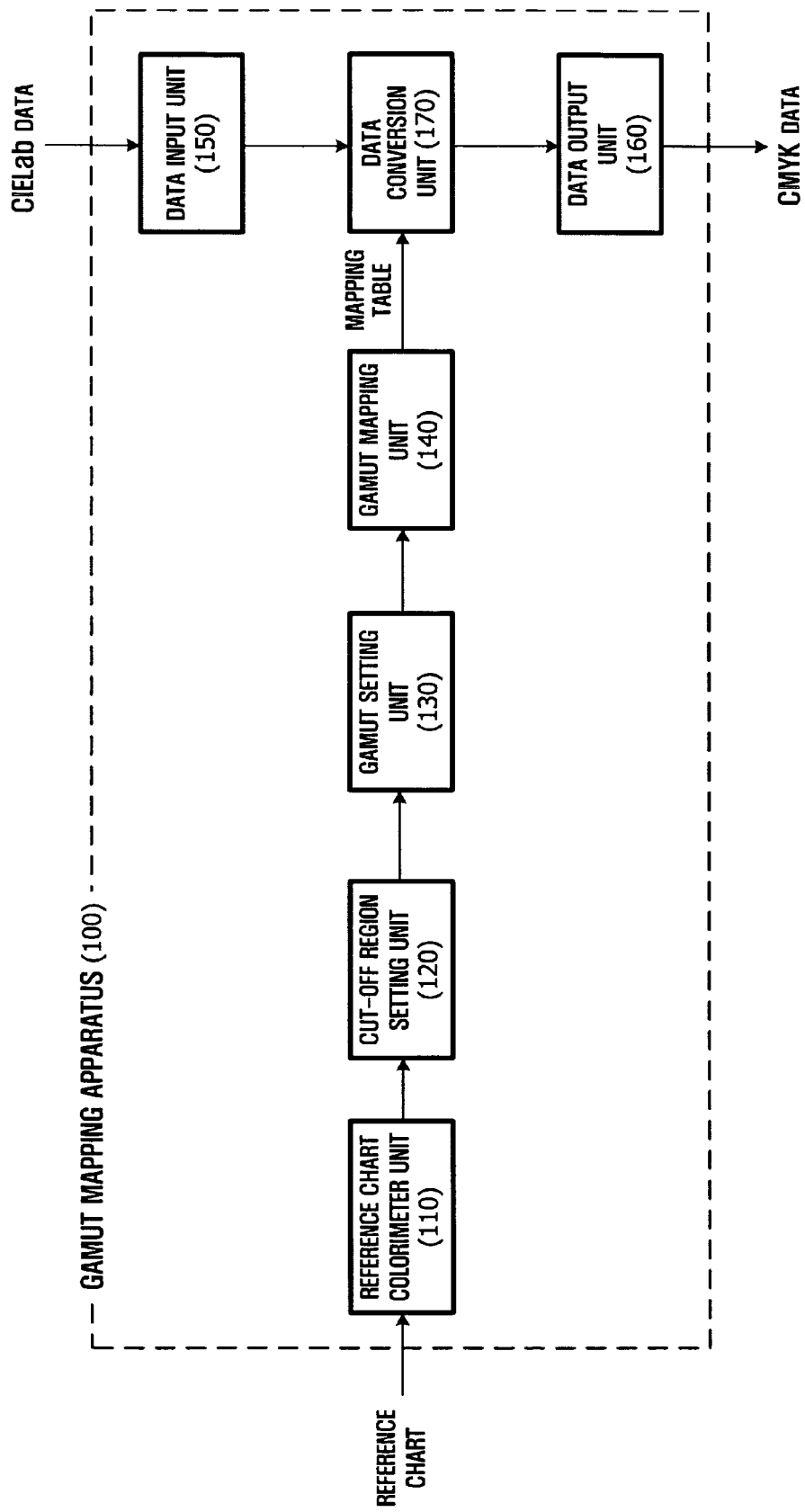
FIG. 3 is a block diagram of a color mapping apparatus according to an exemplary embodiment of the present invention.

FIG. 3 is a block diagram of a gamut mapping apparatus 100 according to an exemplary embodiment of the present invention. Referring to FIG. 3, the gamut mapping apparatus 100 performs gamut mapping by color-measuring a reference chart 10 printed by a printer as a sample chart, and includes a reference chart calorimeter unit 110, a cut-off region setting unit 120, a gamut setting unit 130, and a gamut mapping unit 140. The gamut mapping apparatus 100 may also include a data input unit 150 and a data output unit 160 in order to receive CIELab data and output cyan-magenta-yellow-black (CMYK) data into which the CIELab data is converted.

Figures 4, 5:
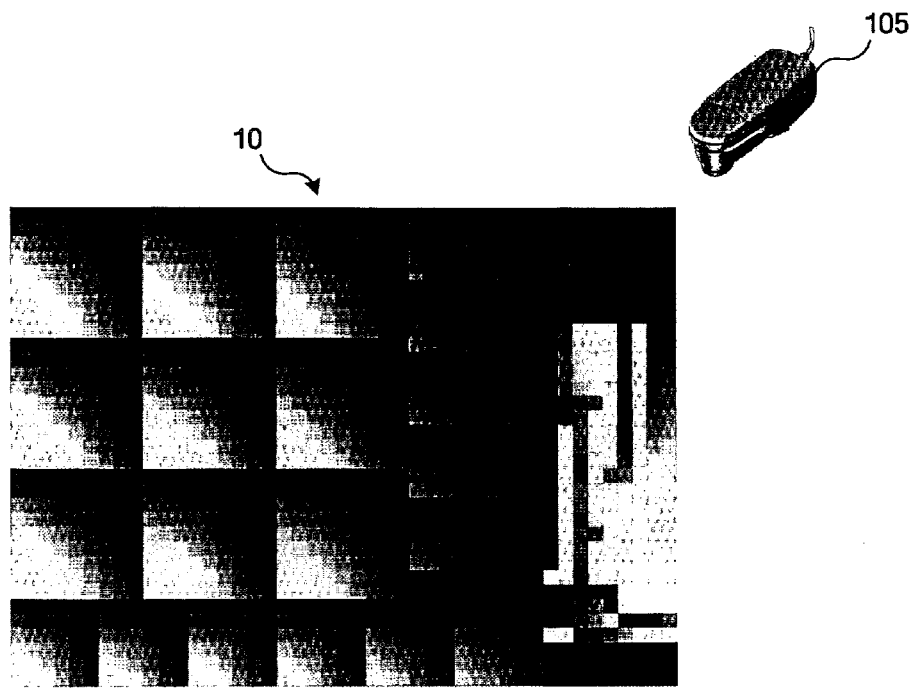
FIG. 4 is a diagram illustrating a reference chart according to an exemplary embodiment of the present invention.
FIG. 5 is a diagram illustrating a cyan-magenta-yellow-black (CMYK)-to-CIELab mapping table according to an exemplary embodiment of the present invention.

The reference chart colorimeter unit 110 color-measures the reference chart 10 using a calorimeter 105 illustrated in FIG. 4, and creates a mapping table which includes mapping information between CMYK data, which is basic color data of a device, and CIELab data, which is colorimetric data obtained through the color measurement. An example of the mapping table is illustrated in FIG. 5 as a CMYK-to-CIELab mapping table 20. Examples of the reference chart 10 include various conventional color charts such as the ECI2002 chart, the TC3.5 chart, and the IT8.7/3 chart.

The reference chart calorimeter unit 110 respectively gives n indexes to n CMYK data of a device, prints the n CMYK data, color-measures the results of the printing, and represents colorimetric data obtained through the color measurement as CIELab data, wherein the n CMYK data are respectively represented as n combinations of C, M, Y, and K components. Thereafter, the reference chart calorimeter unit 110 creates the CMYK-to-CIELab mapping table 20 based on the correspondence between the n CMYK colors and the CIELab colors.

A CMYK color model is generally used to provide input color data for color output devices such as printers. Theoretically, in the CMYK color model, black can be produced by mixing C, M, and Y inks. However, in reality, it is hard to produce black by combining mixing C, M, and Y inks due to impurities in the C, M, and Y inks. Therefore, black ink is used in order to realize black. This type of color realization mode, i.e., a method of realizing colors by mixing C, M, Y, and K inks, is referred to as a CMYK mode. The CMYK mode is generally used for printed material.

On the other hand, a CIELab color model is based on the color model standardized for the first time by the Commission Internationale de l'Eclairage (CIE). CIELab colors are device-independent. In other words, CIELab colors can be uniformly represented regardless of the types of devices which generate and/or output images, i.e., regardless of whether the devices are monitors, printers, or computers. CIELab colors are comprised of the lightness (L) and two color components a and b. The component a is in the range between green and red, and the component b is in the range between blue and yellow.

The cut-off region setting unit 120 determines a portion of an HSV color space as a cut-off region. The HSV color space is based on a color model which represents colors based on three components, i.e., hue (H), saturation (S), and value (V). Here, hue is a color reflected from or transmitted from an object. The hue of a color is measured as the location of the color in a standard color circle and is represented as an angle between 0° and 360°. Hue is used to differentiate various colors such as red, orange, and green from one another. Saturation is interpreted as the intensity or purity of a color. Saturation is the amount of gray present in a color and is measured in the range from 0% (gray) to 100% (pure color). The closer a color is to the circumference of the standard color circle, the higher the saturation of the color is. Value is the brightness or darkness of a color and is measured in the range from 0% (black) to 100% (white).

Figure 6:
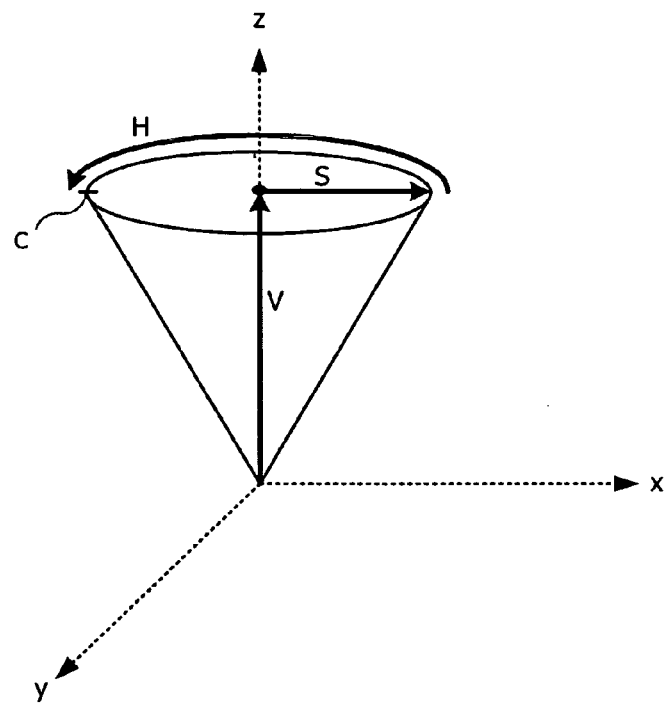
FIG. 6 is a diagram for explaining a method of representing the hue (H), saturation (S), and value (V) of a color in a HSV color space.

FIG. 6 is a diagram for explaining a method of representing H, S, and V of a color in an HSV color space. Referring to FIG. 6, V of a color c is measured as a z coordinate value of the color c, S of the color is measured as the radius of an imaginary circle which corresponds to the color c and is centered on the z-axis, and H of the color is measured as a counterclockwise angle of a sector of the imaginary circle formed between the color c and the x-axis.

Figure 7:
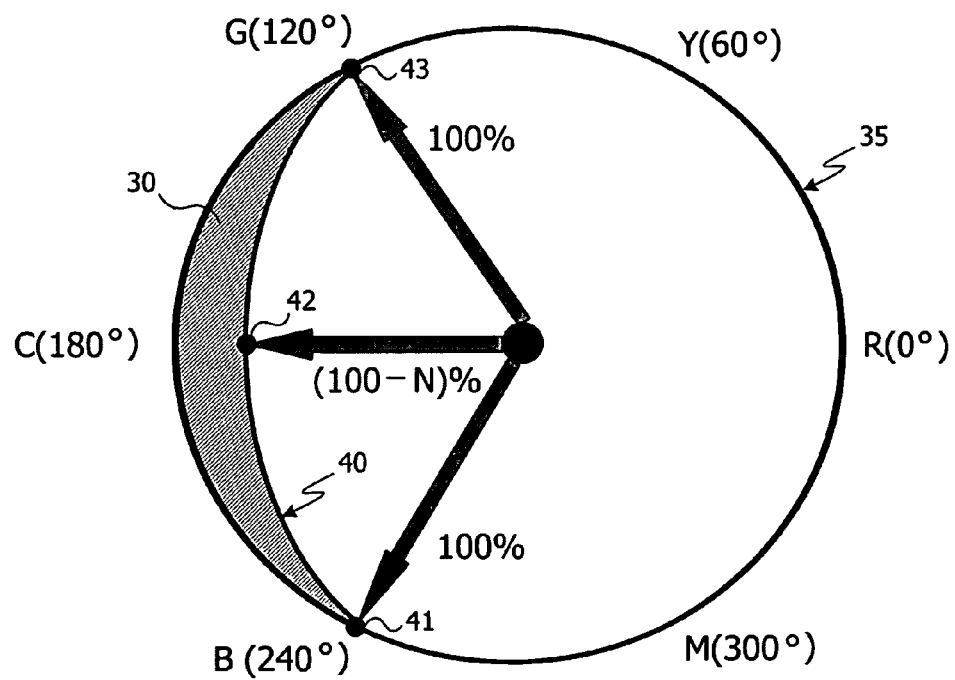
FIG. 7 is a cross-sectional view of the HSV color space seen from the direction of the negative z-axis.

FIG. 7 is a cross-sectional view of the HSV color space seen from the direction of the negative z direction, and particularly, a standard color circle 35. Referring to FIGS. 7, R, G, and B have the same saturation value and are respectively located on the circumference of the standard color circle 35 at angular locations of 0°, 120°, and 240°. R, G, and B and C, M, and Y satisfy Equation (1):

$$R=255-C$$

$$G=255-M$$

$$B=255-Y \qquad (1)$$

Therefore, C, M, and Y are respectively located opposite to R, G, and B. Referring to FIGS. 7, R, Y, G, C, B, and M are sequentially located on the circumference of the standard color circle 35 at intervals of 60°.

Referring to FIG. 3, the cut-off region setting unit 120 cuts off an unnecessary portion of a gamut corresponding to a hue (e.g., C) which cannot be represented by a source device but can be represented by a reproduction device. For this, the cut-off region setting unit 120 sets a cut-off rate (N %) to a default setting value or a value input by a user. Thereafter, the cut-off region setting unit 120 determines a cut-off region 30 which is defined between two hues that are located 60° apart from C, i.e., G and B.

Referring to FIG. 7, the cut-off region setting unit 120 cuts off part of the standard color circle 35 corresponding to a C component by as much as the cut-off rate (N %), and forms a cut-off curve 40 which connects an end point 42 (100–N %) corresponding to the remaining C component, an end point 43 corresponding to a G component, and an end point 41 corresponding to a B component. The cut-off curve 40 may be formed through interpolation by using a typical interpolation method such as a straight-line interpolation method in which a cut-off curve is simply formed by drawing a straight line among a plurality of points. Alternatively, the cut-off curve 40 may be formed through interpolation by using a spline interpolation method. According to the present exemplary embodiment, the cut-off curve 40 may be formed using the straight-line interpolation method, for simplicity.

Once the cut-off curve 40 is formed, the cut-off region 30 is defined on the standard color circle 35 by the cut-off curve 40 and the circumference of the standard color circle 35. The cut-off region 30 is two-dimensional, as illustrated in FIG. 7. However, the cut-off region 30 may be defined in an HSV color space as a three-dimensional cut-off space 50, as illustrated in FIG. 8.

Figure 8:
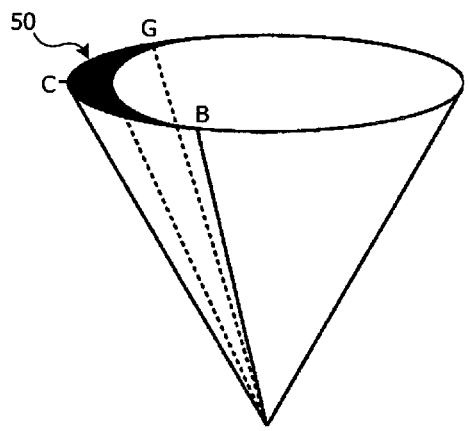
FIG. 8 is a diagram illustrating a cut-off space in an HSV color space according to an exemplary embodiment of the present invention.

Referring to FIG. 3, the gamut setting unit 130 converts each of the n CMYK data listed in the CMYK-to-CIELab mapping table 20 into HSV data, and determines whether the HSV data belongs to the cut-off space 50 illustrated in FIG. 8. Thereafter, the gamut setting unit 130 sets a gamut boundary using CMYK data corresponding to HSV data which does not belong to the cut-off space 50.

The conversion of RGB data into HSV data may be indicated by Equation (2):

$$V=\text{Max}(R,G,B)$$

$$S=0 \text{ if } V=0$$

$$S=[V-\text{Min}(R,G,B)]/V \text{ if } V>0$$

$$H=0 \text{ if } S=0$$

$$H=60(G-B)/SV \text{ if } V=R$$

$$H=60[2+(B-R)/SV] \text{ if } V=G$$

$$H=120[4+(R-G)/SV] \text{ if } V=B \qquad (2)$$

where, if H has a negative value, 360 is added to H, and the result of the addition is used as H. The conversion of CMYK data into HSV data may be indicated by the combination of Equations (1) and (2).

For example, if N=100, the gamut setting unit 130 determines whether 100 CMYK listed in the CMYK-to-CIELab mapping table 20 belongs to the cut-off space 50. If, of the 100 CMYK data, 20 CMYK data are determined as belonging to the cut-off space 50, the gamut setting unit 130 sets a gamut boundary based on the remaining 80 CMYK data (hereinafter referred to as the remaining CMYK data). Thereafter, N may be reset to a value of 80.

Figure 9:
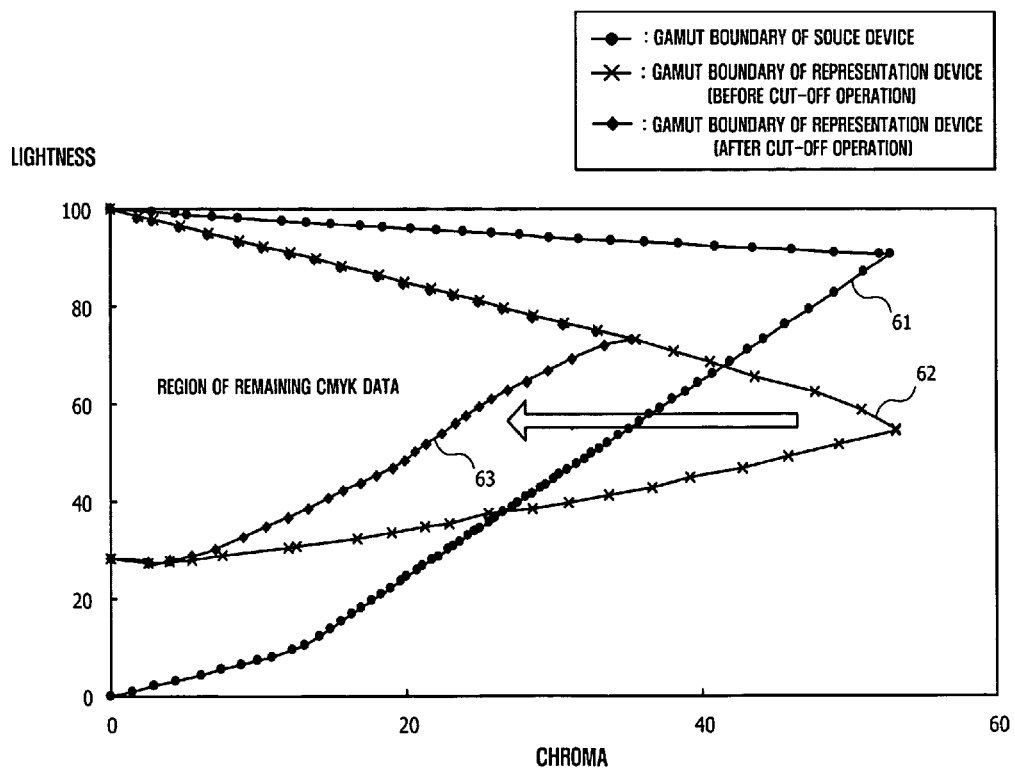
FIG. 9 is a diagram for comparing an original gamut boundary of a reproduction device with a remaining gamut boundary of the reproduction device obtained by cutting off part of an original gamut of the reproduction device according to an exemplary embodiment of the present invention.

FIG. 9 is a diagram for comparing an original gamut boundary 62 of the reproduction device, which is realized on a C-L plane, with a remaining gamut boundary 63 determined by cutting off part of a gamut of the reproduction device within a region corresponding to C according to an exemplary embodiment of the present invention. Referring to FIG. 9, all the CMYK data listed in the CMYK-to-CIELab mapping table 20 are respectively represented on the C-L plane as a plurality of points, and the original gamut boundary 62 is obtained by connecting the outermost points of the plurality of points to one another. The original gamut boundary 62 may not exactly coincide with a gamut boundary 61 of the source device, especially for C or colors similar to C. According to the present exemplary embodiment, part of the gamut of the reproduction device is cut off, and the remaining gamut boundary 63 is obtained from CMYK data corresponding to the remaining gamut of the reproduction device. A gamut of the reproduction device defined by the remaining gamut boundary 63 is within a gamut of the source device defined by the gamut boundary 61. In the exemplary embodiment illustrated in FIG. 9, the cut-off rate is set to 40%. The gamut boundary 61 of the source device and the gamut of the source device defined by the gamut boundary 61 may be determined with reference to the CMYK-to-CIELab mapping table 20 illustrated in FIG. 5.

Referring to FIG. 3, the gamut mapping unit 140 modifies the remaining gamut boundary 63 to conform to the gamut boundary 61 of the source device so that a user can perceive a color represented by the reproduction device as being the same as a color displayed by the source device.

In detail, the gamut mapping unit 140 modifies a lightness range of the source device to coincide with a lightness range of the reproduction device in order for the reproduction device to provide a user with a color sense almost indistinguishable from that of the source device.

Figure 10:
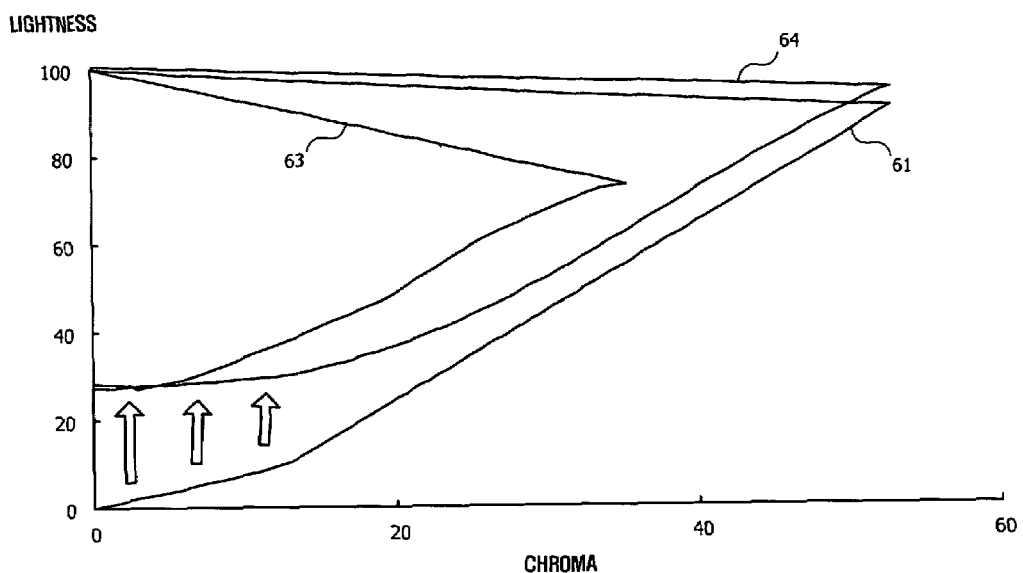
FIG. 10 is a diagram for explaining a method of modifying the lightness range of a source device to coincide with the lightness range of a reproduction device according to an exemplary embodiment of the present invention.
Figure 11:
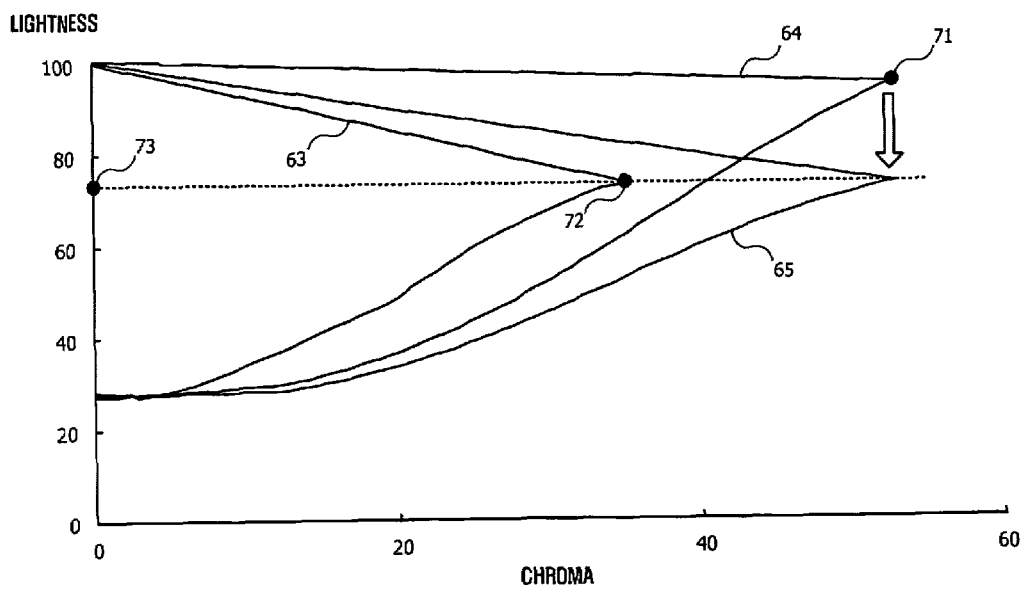
FIG. 11 is a diagram for explaining a method of making a cusp of a gamut boundary of a source device coincide with a cusp of a gamut boundary of a target device according to an exemplary embodiment of the present invention.

FIG. 10 is a diagram for explaining a method of modifying the lightness range of the source device to coincide with the lightness range of the reproduction device according to an exemplary embodiment of the present invention. Referring to FIG. 10, the remaining gamut boundary 63 of the reproduction device ranges between a lightness of about 30 and a lightness of 100, whereas the gamut boundary 61 of the source device ranges between a lightness of 0 and a lightness of 100. In order for the lightness range of the source device to coincide with the lightness range of the reproduction device, the lightness range of the source device must be shifted upward by about 30. A gamut boundary 64 is obtained as the result of the shifting. When the gamut boundary 61 is shifted upward, a plurality of points on the gamut boundary 61 is shifted upward accordingly. The gamut boundary 61 of the source device may be shifted using various methods. For example, the gamut boundary 61 may be linearly shifted in consideration of the lightness of the plurality of points on the gamut boundary 61.

Thereafter, the gamut mapping unit 140 relocates a cusp 71 of the gamut boundary 64 such that the relocated cusp 71 can be on a level with a cusp 72 of the remaining gamut boundary 63, thereby obtaining a gamut boundary 65. The relocation of the cusp 71 of the gamut boundary 64 is performed in order to make the user receive almost the same feeling of colors from the reproduction device as from the source device by making a color distribution of the source device become similar to a color distribution of the reproduction device. Other points on the gamut boundary 64 excluding the cusp 71 may be linearly shifted according to their lightness.

Thereafter, the gamut mapping unit 140 determines an intersection point where a straight line drawn through the relocated cusp 71 and the cusp 72 intersects the lightness axis as an anchor point 73.

Figures 12, 13:
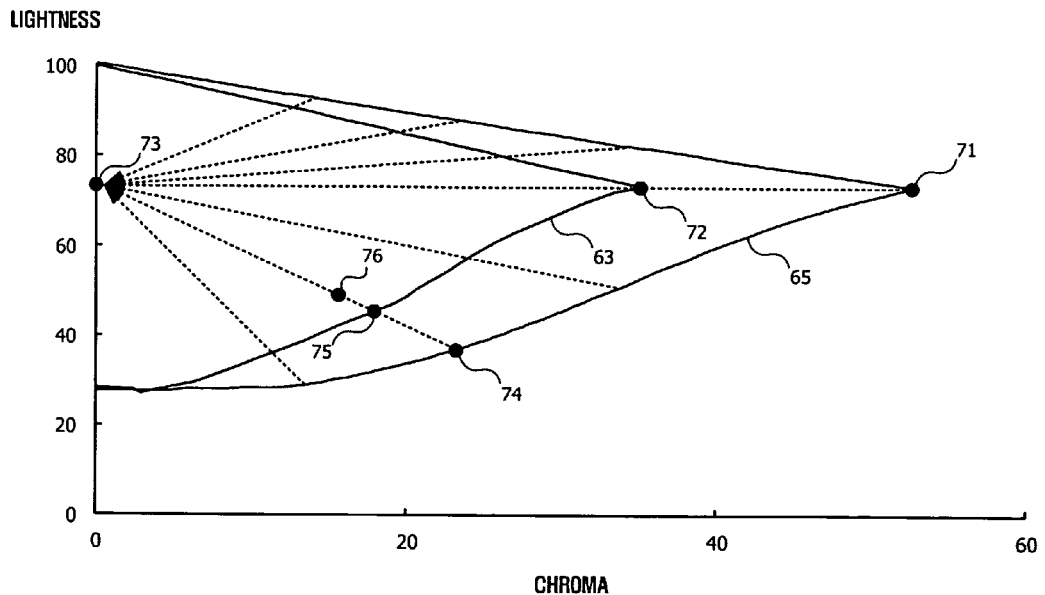
FIG. 12 is a diagram for explaining a method of performing gamut mapping using a predetermined anchor point according to an exemplary embodiment of the present invention.
FIG. 13 is a diagram illustrating a CIELab-to-CMYK mapping table according to an exemplary embodiment of the present invention.

Thereafter, referring to FIG. 12, the gamut mapping unit 140 performs gamut mapping on the basis of the anchor point 73 using a clipping method or a compression method. In the clipping method, gamut mapping is performed such that an arbitrary point on the gamut boundary 65 is mapped to an intersection point between the remaining gamut boundary 63 and a straight line drawn through the arbitrary point and the anchor point 73.

On the other hand, in the compression method, gamut mapping is performed in consideration of the ratio between the distance between the cusp 71 of the gamut boundary 65 and the anchor point 73 and the distance between the cusp 72 of the remaining gamut boundary 63 and the anchor point 73 such that an arbitrary point on the gamut boundary 65 is mapped to a predetermined point which is located on a straight line drawn through the arbitrary point and the anchor point 73 and that the ratio between the distance between the arbitrary point and the anchor point 73 and the distance between the predetermined point and the anchor point 73 is the same as the ratio between the distance between the cusp 71, of the gamut boundary 65 and the anchor point 73 and the distance between the cusp 72 of the remaining gamut boundary 63 and the anchor point 73. For example, since the ratio between the distance between the anchor point 73 and a point 74 on the gamut boundary 65 and the distance between the anchor point 73 and a point 76 which is located on a straight line drawn through the point 74 and the anchor point 73 is the same as the distance between the cusp 71 of the gamut boundary 65 and the anchor point 73 and the distance between the cusp 72 of the remaining gamut boundary 63 and the anchor point 73, the point 74 can be mapped to the point 76. The aforementioned color mapping methods can be applied to a plurality of points inside the gamut boundary 65 as well as to those on the gamut boundary 65.

Since the user already knows about the correspondence between the points which are located on or inside the gamut boundary 65 and a plurality of points which are located on or inside the gamut boundary 61 illustrated in FIG. 9, the user can determine the correspondence between the points which are located on or inside the gamut boundary 61 and the points which are located on or inside the remaining gamut boundary 63.

The gamut mapping unit 140 creates a CIELab-to-CMYK mapping table 25 illustrated in FIG. 13 based on the mapping relationship between the gamut boundary 61 and the remaining gamut boundary 63. The CMYK-to-CIELab mapping table 20 illustrated in FIG. 5 presents a plurality of indexed CMYK data and a plurality of CIELab data respectively corresponding to the plurality of indexed CMYK data, whereas the CIELab-to-CMYK mapping table 25 presents a plurality of indexed CIELab data and a plurality of CMYK data respectively corresponding to the plurality of indexed CIELab data. CIELab data, which is used in the source device, may be used as input data of the gamut mapping apparatus 100, whereas CMYK data which is used in the reproduction device may be used as output data of the gamut mapping apparatus 100. If the CIELab-to-CMYK mapping table 25 provides a total of 10 default values for CIEL, CIEa, and CIEb, respectively, a total of 1000 indexes may be generated, i.e., M=1000. The quantity of default values provided by the CIELab-to-CMYK mapping table 25 may vary from one color component to another.

The aforementioned gamut mapping method using a reference chart is conducted during the manufacture of a reproduction device. However, the gamut mapping method may also be performed after the manufacture of a reproduction device equipped with the gamut mapping apparatus 100 in the following manner: the data input unit 150 receives CIELab data; a data conversion unit 170 converts the CIELab data into CMYK data with reference to the CIELab-to-CMYK mapping table 25; and the data output unit 160 provides the reproduction device with the CMYK data so that the reproduction device can print the CMYK data.

As described above, exemplary embodiments of the present invention have been described assuming that color data used by a source device is CIELab data and that color data used by a reproduction device is CMYK data. However, the present invention is not restricted to this. In other words, the present invention can be applied to various color data such as CIEJab data using a color appearance model, RGB data, YUV data, HSV data, and etc.

A variety of exemplary logic blocks used in this disclosure to describe the exemplary embodiments of the present invention may be realized using or executed by a universal processor, a digital signal processor (DSP), an application specific integrated circuit (ASIC), a field programmable gate array (FPGA) or another programmable logic device, a discrete logic gate or a transistor logic device, and discrete hardware components which perform the functions set forth in this disclosure, or any combinations thereof. The universal processor may be a microprocessor. Alternatively, the universal processor may be any typical processor, a controller, a microcontroller, or state machine. The universal processor may also be a combination of a DSP and a microprocessor, a combination of a plurality of microprocessors, or a combination of a DSP core and one or more microprocessors.

As described above, according to the present invention, it is possible for a reproduction device to realize colors of an image originally provided by a source device while maintaining the overall appearance of the image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A gamut mapping method implemented by a gamut mapping apparatus including a processor having computing device-executable instructions, the method comprising:
    (a) setting a cut-off rate for a predetermined color component and defining a cut-off region on a standard color circle;
    (b) determining a gamut of a reproduction device using color data which is part of basic color data and which corresponds to colors that do not belong to the cut-off region;
    (c) modifying a gamut of a source device according to the determined gamut of the reproduction device;
    (d) determining a mapping relationship between the modified gamut of the source device and the determined gamut of the reproduction device; and
    (e) creating a mapping table based on the determined mapping relationship, the mapping table presenting a relationship between color data represented in a color space of the source device and color data represented in a color space of the reproduction device,
    wherein the cut-off region is defined by a cut-off curve and a circumference of the standard color circle, wherein the cut-off curve is formed by drawing a curve through a point, which corresponds to the predetermined color component multiplied by the cut-off rate, and two points which are located on the circumference of the standard color circle apart from the predetermined color component.

2. The gamut mapping method of claim 1, wherein the predetermined color component is cyan.

3. The gamut mapping method of claim 1 further comprising obtaining colorimetric data for the basic color data by color-measuring a reference chart,
    wherein the gamut of the source device is determined based on the colorimetric data.

4. The gamut mapping method of claim 1 further comprising converting input color data with reference to the determined mapping relationship, and outputting color data obtained through the conversion.

5. The gamut mapping method of claim 4, wherein the input color data is CMYK data, and the output color data is CIELab data.

6. The gamut mapping method of claim 1, wherein the cut-off rate is 40%.

7. The gamut mapping method of claim 1, wherein the basic color data is CMYK data.

8. The gamut mapping method of claim 1, wherein (c) comprises:
    (c1) preliminarily modifying the gamut of the source device such that a lightness range corresponding to the gamut of the source device coincides with a lightness range corresponding to the determined gamut of the reproduction device; and
    (c2) secondarily modifying again such that a lightness of a cusp of the result of the preliminary modification is the same as a lightness of a cusp of the determined gamut of the reproduction device.

9. The gamut mapping method of claim 8, wherein (d) comprises:
    (d1) determining an intersection point where a straight line drawn through the cusp of the result of preliminary modification and the cusp of the determined gamut of the reproduction device intersects an axis of lightness as an anchor point; and
    (d2) mapping a point included in the result of the secondary modification to a point included in the determined gamut of the reproduction device in consideration of the location of the point included in the result of the secondary modification relative to the anchor point.

10. The gamut mapping method of claim 9, wherein (d2) comprises performing one of a clipping method and a compression method.

11. The gamut mapping method of claim 1, wherein the color space of the source device is one of a CIELab space and a CIECAM02 space based on a color appearance model, and the color space of the reproduction device is one of a CMYK color space, an RGB color space, and a CMY color space.

12. The gamut mapping method of claim 1, wherein the two points are located on the circumference of the standard color circle 60° apart from the predetermined color component.

13. A gamut mapping apparatus comprising:
    a cut-off region setting unit which sets a cut-off rate for a predetermined color component and defines a cut-off region on a standard color circle;
    a gamut setting unit which determines a gamut of a reproduction device using color data which is part of basic color data and which corresponds to colors that do not belong to the cut-off region; and
    a gamut mapping unit which modifies a gamut of a source device according to the determined gamut of the reproduction device, determines mapping relationship between the modified gamut of the source device and the determined gamut of the reproduction device, and creates a mapping table based on the determined mapping relationship, the mapping table presenting a relationship between color data represented in a color space of the source device and color data represented in a color space of the reproduction devices
    wherein the cut-off region is defined by a cut-off curve and a circumference of the standard color circle, wherein the cut-off curve is formed by drawing a curve through a point, which corresponds to the predetermined color component multiplied by the cut-off rate, and two points which are located on the circumference of the standard color circle apart from the predetermined color component.

14. The gamut mapping apparatus of claim 13, wherein the predetermined color component is cyan.

15. The gamut mapping apparatus of claim 13 further comprising a reference chart colorimeter unit which obtains colorimetric data for the basic color data by color-measuring a reference chart,
    wherein the gamut of the source device is determined based on the colorimetric data.

16. The gamut mapping apparatus of claim 13 further comprising a data conversion unit which converts input color data with reference to the determined mapping relationship, and outputs color data obtained through the conversion.

17. The gamut mapping apparatus of claim 16, wherein the input color data is CMYK data, and the output color data is CIELab data.

18. The gamut mapping apparatus of claim 13, wherein the cut-off rate is 40%.

19. The gamut mapping apparatus of claim 13, wherein the basic color data is CMYK data.

20. The gamut mapping apparatus of claim 13, wherein the gamut mapping unit preliminarily modifies the gamut of the source device such that a lightness range corresponding to the gamut of the source device coincides with a lightness range corresponding to the determined gamut of the reproduction device, and secondarily modifies a result of the preliminary modification such that a lightness of a cusp of the result of the preliminary modification is the same as a lightness of a cusp of the determined gamut of the reproduction device.

21. The gamut mapping apparatus of claim 20, wherein the gamut mapping unit determines an intersection point where a straight line drawn through the cusp of the result of preliminary modification and the cusp of the determined gamut of the reproduction device intersects an axis of lightness as an anchor point, and maps a point included in the result of the secondary modification to a point included in the determined gamut of the reproduction device in consideration of the location of the point included in the result of the secondary modification relative to the anchor point.

22. The gamut mapping apparatus of claim 21, wherein the gamut mapping unit performs one of a clipping method and a compression method.

23. The gamut mapping apparatus of claim 22, wherein the color space of the source device is one of a CIELab space and a CIECAM02 space based on a color appearance model, and the color space of the reproduction device is one of a CMYK color space, an RGB color space, and a CMY color space.

24. A color printer comprising the gamut mapping apparatus of claim 13.

25. The gamut mapping apparatus of claim 13 wherein the two points are located on the circumference of the standard color circle 600 apart from the predetermined color component.

* * * * *